United States Patent
Yamazaki

(10) Patent No.: US 7,605,997 B2
(45) Date of Patent: Oct. 20, 2009

(54) HEAD-GAP CALCULATING DEVICE, STORAGE DEVICE, HEAD-GAP CALCULATING METHOD, AND COMPUTER PRODUCT

(75) Inventor: Akihiro Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 40 days.

(21) Appl. No.: 11/999,123

(22) Filed: Dec. 4, 2007

(65) Prior Publication Data

US 2008/0186619 A1   Aug. 7, 2008

(30) Foreign Application Priority Data

Feb. 5, 2007   (JP) ............... 2007-026102

(51) Int. Cl.
*G11B 21/02* (2006.01)
(52) U.S. Cl. .................................... 360/75
(58) Field of Classification Search ............ 360/75, 360/31, 65, 77.08; 701/207
See application file for complete search history.

(56) References Cited

U.S. PATENT DOCUMENTS

| | | | | |
|---|---|---|---|---|
| 3,831,010 A * | 8/1974 | Games et al. | ............... | 701/207 |
| 4,122,502 A * | 10/1978 | Kobayashi | ................... | 360/65 |
| 6,249,393 B1 * | 6/2001 | Billings et al. | ................ | 360/31 |
| 6,671,110 B2 | 12/2003 | Baba et al. | | |
| 7,369,341 B2 * | 5/2008 | Yokohata et al. | .............. | 360/31 |
| 7,440,224 B2 * | 10/2008 | Ehrlich et al. | ............ | 360/77.08 |
| 2005/0046985 A1 | 3/2005 | Morinaga et al. | | |
| 2005/0213250 A1 | 9/2005 | Kurita et al. | | |
| 2006/0139789 A1 | 6/2006 | Yang | | |
| 2007/0127147 A1 * | 6/2007 | Yokohata et al. | .............. | 360/31 |
| 2007/0127148 A1 * | 6/2007 | Yokohata et al. | .............. | 360/31 |
| 2007/0211361 A1 * | 9/2007 | Imamura et al. | .............. | 360/31 |
| 2007/0230015 A1 * | 10/2007 | Yamashita et al. | ........... | 360/75 |

FOREIGN PATENT DOCUMENTS

| | | |
|---|---|---|
| EP | 0 605 343 | 7/1994 |
| JP | 2004-014092 | 1/2004 |
| JP | 2005-071546 | 3/2005 |
| JP | 2005-276284 | 10/2005 |
| JP | 2006-190454 | 7/2006 |
| KR | 0130739 | 4/1998 |
| KR | 2001-0022948 | 3/2001 |
| KR | 2001-0078765 | 8/2001 |
| WO | WO 99/09546 | 2/1999 |

* cited by examiner

*Primary Examiner*—Fred Tzeng
(74) *Attorney, Agent, or Firm*—Greer, Burns & Crain, Ltd.

(57) ABSTRACT

A harmonic wave obtaining unit performs a fast Fourier transform (FFT) operation on repeatable run out (RRO) correction data in the time domain and transforms the RRO correction data into a higher harmonic signal data in the frequency domain. A selective-output unit outputs wavelength and amplitude of a first-order harmonic wave and of a third-order harmonic wave of the higher harmonic signal data to a hard disk controller via a formatting unit. A hard disk controller calculates a head-gap between a magnetic head and a magnetic disk in a storage device at the time of reading user data as well as servo data.

12 Claims, 6 Drawing Sheets

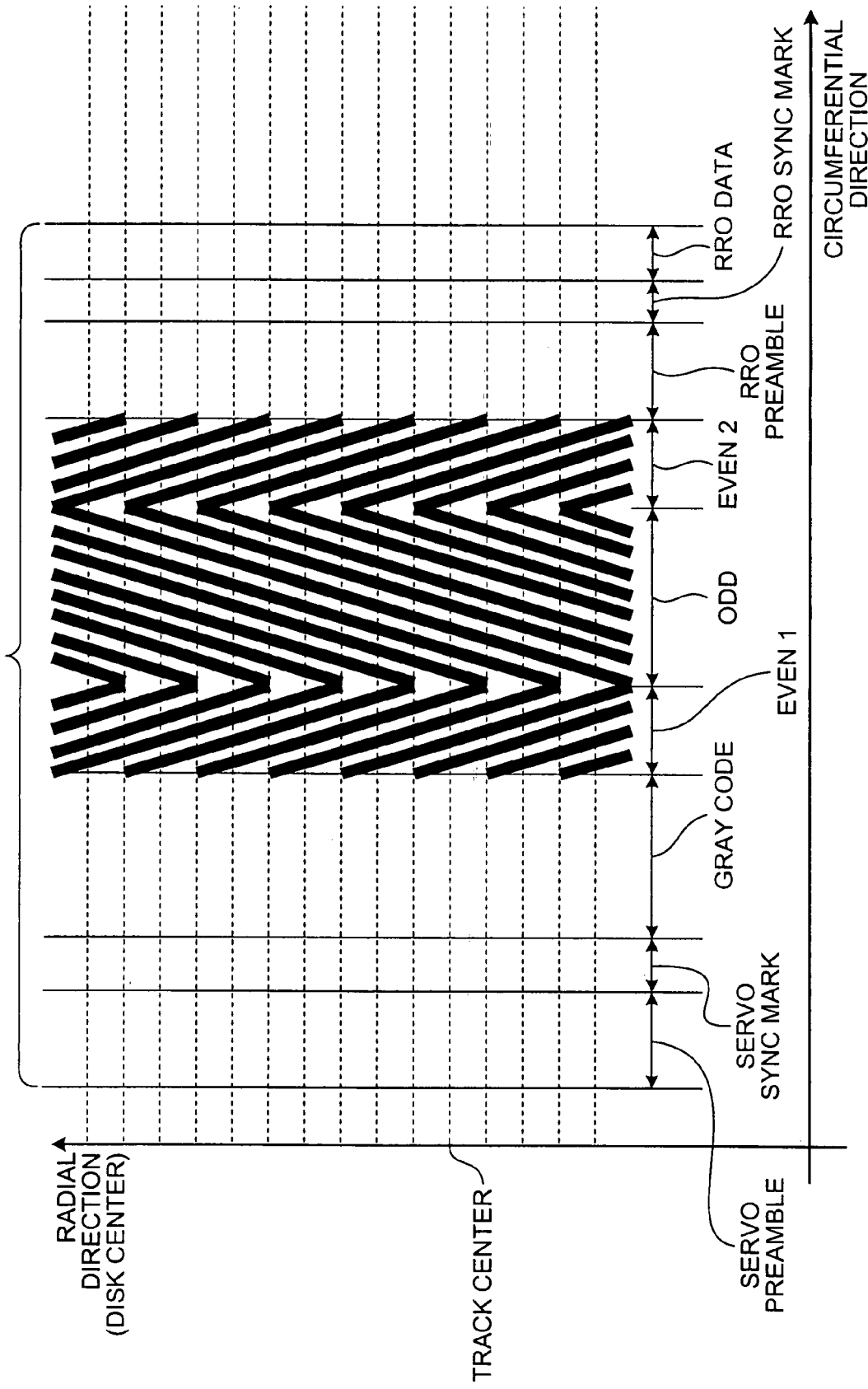

HEAD-GAP CALCULATING DEVICE, STORAGE DEVICE, HEAD-GAP CALCULATING METHOD, AND COMPUTER PRODUCT

BACKGROUND OF THE INVENTION

1. Field of the Invention

The present invention relates to a technology for calculating a head-gap between a head and a disk of a storage device.

2. Description of the Related Art

Generally, a storage device such as a magnetic disk device or a magneto-optical disk device used to store data on a disk includes a head arranged in a contactless manner with respect to the disk. The head reads data from or writes data to the disk. While reading the data, the head senses magnetic signals or signals of laser beams reflected from the disk. Hence, the more the head is arranged proximal to the disk, the better is the sensitivity of the head to sense such signals, which improves the quality of retrieved data. In recent years, following the improvement in recording density of the disk, the distance between the head and the disk, i.e., the head-gap has reduced to, e.g., 10 nanometers.

Consequently, it has become increasingly necessary to monitor and regulate changes in the head-gap that may be affected by various surrounding conditions. In that regard, Japanese Patent Application Laid-Open No. 2004-14092 discloses a conventional technology for calculating and regulating the head-gap. According to the conventional technology, data required for calculating a head-gap is stored in advance in a disk. The head-gap is calculated based on the amplitude of a fundamental wave component and of a second frequency component of the data.

However, in the conventional technology, it is necessary to allocate a certain amount of storage area on the disk to store the data for head-gap calculation, resulting in less storage area for storing user data. Particularly, in recent years, the requirement is to manufacture disks with large storage capacity and high recording density. From this viewpoint, it is disadvantageous that the data for head-gap calculation occupies a certain amount of storage area on the disk.

Moreover, the head-gap can be calculated only at a predetermined interval at which the data for head-gap calculation stored in the disk is regenerated. In other words, the head-gap cannot be calculated at the time of, e.g., storing or regenerating signals of servo data. Hence, it is not possible to have real-time control on the head-gap.

SUMMARY OF THE INVENTION

It is an object of the present invention to at least partially solve the problems in the conventional technology.

1. According to an aspect of the present invention, a head-gap calculating device that calculates a head-gap between a storage medium and a head in a storage device, includes a converting unit that receives via the head a plurality of analog signals from the storage medium, and converts the analog signals into digital signals; a wave-component obtaining unit that performs signal conversion on control signals necessary for reading user data from among the digital signals to obtain a fundamental wave component and a higher harmonic wave component; and a head-gap calculating unit that calculates the head-gap based on the fundamental wave component and the higher harmonic wave component.

According to another aspect of the present invention, storage device includes a head-gap calculating device that calculates a head-gap between a storage medium and a head in a storage device, and includes a converting unit that receives via the head a plurality of analog signals from the storage medium, and converts the analog signals into digital signals; a wave-component obtaining unit that performs signal conversion on control signals necessary for reading user data from among the digital signals to obtain a fundamental wave component and a higher harmonic wave component; and a head-gap calculating unit that calculates the head-gap based on the fundamental wave component and the higher harmonic wave component.

According to still another aspect of the present invention, a head-gap calculating method for calculating a head-gap between a storage medium and a head in a storage device, includes converting a plurality of analog signals read via the head from the storage medium into digital signals; obtaining a fundamental wave component and a higher harmonic wave component by performing signal conversion on control signals necessary for reading user data from among the digital signals; and calculating the head-gap based on the fundamental wave component and the higher harmonic wave component.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is schematic diagram of a pattern of servo data and RRO data recorded on a sector in a track of the magnetic disk;

DETAILED DESCRIPTION OF THE PREFERRED EMBODIMENTS

Exemplary embodiments of the present invention are described in detail below with reference to the accompanying drawings. The exemplary embodiments are described as being applied to a magnetic disk as a storage medium and a magnetic disk device as a storage device. However, any other pair of a storage medium and a storage device such as a pair of an optical disk and an optical disk device or a pair of a magneto optical disk and a magneto-optical disk device can also be used.

Given below is the description of a read channel built in a magnetic disk device. In the magnetic disk device, a magnetic head reads output signals from a magnetic disk. The read channel then performs code demodulation on the output signals and sends the code-demodulated signals to a hard disk controller.

Figure 1:
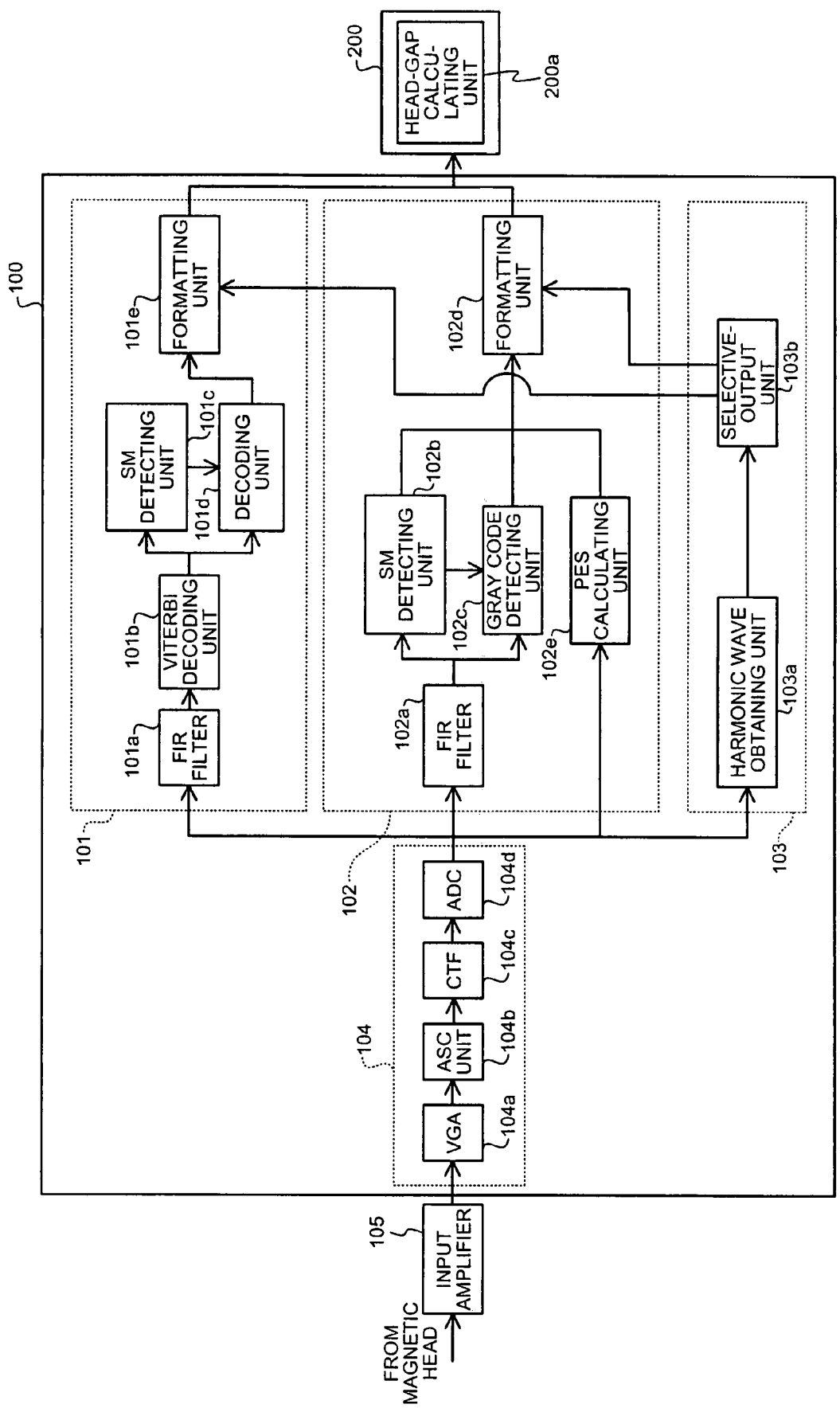
FIG. 1 is a functional block diagram of a read channel according to an embodiment of the present invention.

FIG. 1 is a functional block diagram of a read channel 100 according to an embodiment of the present invention. The read channel 100 includes a user-data processor 101, a servo-data processor 102, a fast Fourier transform (FFT) processor 103, and an analog front-end unit 104.

The user-data processor 101 regenerates user data read from a magnetic disk, and includes a finite impulse response (FIR) filter 101a, a viterbi decoding unit 101b, a synchronization mark (SM) detecting unit 101c, a decoding unit 101d, and a formatting unit 101e.

Upon receiving digital signals of user data from the analog front-end unit 104, the FIR filter 101a filters the digital signals and performs waveform equalization of the filtered signals. The viterbi decoding unit 101b estimates a bit pattern of the waveform-equalized signals, and accordingly, selects a possible bit sequence of the waveform-equalized signals. The SM detecting unit 101c then detects a user-data synchronization mark (hereinafter, "data sync mark"), which indicates the starting position of the user data from the waveform-equalized signals.

The decoding unit 101d decodes the user data based on the bit sequence and the data sync mark, thereby obtaining serial signals of the user data. The formatting unit 101e converts the serial signals into parallel signals and sends the parallel signals to a hard disk controller 200.

The servo-data processor 102 regenerates servo data read from the magnetic disk. The servo data gives information about positioning a magnetic head in a magnetic disk device. The servo-data processor 102 includes a FIR filter 102a, an SM detecting unit 102b, a gray code detecting unit 102c, a formatting unit 102d, and a position error signal (PES) calculating unit 102e.

Upon receiving digital signals of servo data from the analog front-end unit 104, the FIR filter 102a filters the digital signals and performs waveform equalization of the filtered signals. The SM detecting unit 102b detects a servo-data synchronization mark (hereinafter, "servo sync mark"), which indicates the starting position of the servo data from the waveform-equalized signals.

The gray code detecting unit 102c detects a gray code in the servo data based on the waveform-equalized signals and the servo sync mark. The gray code is information for identifying a target track to which the magnetic head is to be positioned.

The formatting unit 102d converts the gray code into parallel signals and sends the parallel signals to the hard disk controller 200.

The PES calculating unit 102e calculates a position error signal generated at the time of positioning the magnetic head on the target track based on servo burst signals. That is, the PES calculating unit 102e calculates the amount of deviation of the magnetic head from the centerline of the target track. Based on the position error signal, the magnetic head is feedback-controlled to the centerline of the target track.

The FFT processor 103 performs a FFT operation on the preamble of repeatable run out (RRO) correction data read from the magnetic disk. The RRO correction data gives information about errors in rotational synchronization generated at the time of determining the position of a magnetic head. The FFT processor 103 includes a harmonic wave obtaining unit 103a and a selective-output unit 103b.

The harmonic wave obtaining unit 103a performs a fast Fourier transform process on the preamble of the RRO correction data to transform the preamble in the time domain into a higher harmonic signal data in the frequency domain. The converted higher harmonic signal data includes higher harmonic wave signals of a first-order harmonic wave, a second order harmonic wave, and so on up to an nth-order harmonic wave. Instead of the FFT processor 103a, it is possible to use the PES calculating unit 102e to calculate the first-order harmonic wave.

A head-gap H of the magnetic head with respect to the magnetic disk is calculated by Equation (1) as follows:

Equation (1)

$$H = H_0 + k \cdot \frac{n \cdot \lambda_n}{2\pi(n-1)} \cdot \log\left\{\frac{(V_1/V_n)}{(V_1/V_n)_0}\right\} \quad (1)$$

where $\lambda_1$ is the wavelength of the first-order harmonic wave (fundamental wave), $V_1$ is the amplitude of the fundamental wave, $\lambda_n$ is the wavelength of the nth-order harmonic wave, $V_n$ is the amplitude of the nth-order harmonic wave, and $H_0$ is the initial value of the head-gap H. The head-gap H can be set to zero assuming that the magnetic head abuts against the magnetic disk. Besides, $(V_1/V_n)_0$ is the initial value of $(V_1/V_n)$ and corresponds to a reference head-gap. The value of correction coefficient k is obtained by actual measurement depending on the performance of the magnetic disk. Meanwhile, 'log' represents natural logarithm.

In the present embodiment, the value of n is set to 3 (n=3) to efficiently obtain the head-gap H based on the harmonic wave properties. That is, the head-gap H is calculated by Equation (2) as follows:

Equation (2)

$$H = H_0 + k \cdot \frac{3 \cdot \lambda_3}{4\pi} \cdot \log\left\{\frac{(V_1/V_3)}{(V_1/V_3)_0}\right\} \quad (2)$$

where $\lambda_3$ is the wavelength of the third-order harmonic wave, and $\lambda_3$ is the amplitude $V_3$ of the third-order harmonic wave.

The selective-output unit 103b selectively outputs the fundamental wave and the third-order harmonic wave to either of the formatting unit 101e and the formatting unit 102d.

More particularly, when the RRO correction data is to be processed by the user-data processor 101, the selective-output unit 103b outputs the fundamental wave and the third-order harmonic wave to the formatting unit 101e. On the other hand, when the RRO correction data is to be processed by the servo-data processor 102, the selective-output unit 103b outputs the fundamental wave and the third-order harmonic wave to the formatting unit 102d.

Based on the fundamental wave and the third-order harmonic wave (or the nth-order harmonic wave) output to the formatting unit 101e or the formatting unit 102d, a head-gap calculating unit 200a in the hard disk controller 200 calculates the head-gap H from Equation (2) (or Equation (1)).

As described above, the selective-output unit 103b is configured to selectively output the fundamental wave and the third-order harmonic wave to either of the formatting unit 101e and the formatting unit 102d. However, the selective-output unit 103b can be configured to simultaneously output the fundamental wave and the third-order harmonic wave to both the formatting unit 101e and the formatting unit 102d.

The analog front-end unit 104 includes a variable gain amplifier (VGA) 104a, an asymmetric collection (ASC) unit 104b, a continuous time filter (CTF) 104c, and an analog-to-digital converter (ADC) 104d. Upon receiving from an input amplifier 105 analog signals read by the magnetic head from the magnetic disk, the VGA 104a regulates the gain of the analog signals. The ASC unit 104b corrects the asymmetrical amplitude of the gain-regulated analog signals.

The CTF 104c then performs waveform equalization of the analog signals with symmetrical amplitude. The ADC 104d converts the waveform-equalized analog signals into digital signals. If the digital signals are regarding the user data, then the analog front-end unit 104 sends them to the user-data processor 101. On the other hand, if the digital signals are regarding the servo data, then the analog front-end unit 104 sends them to the servo-data processor 102. If the digital signals are regarding the RRO correction data, then the analog front-end unit 104 sends them to the FFT processor 103.

Figure 2:
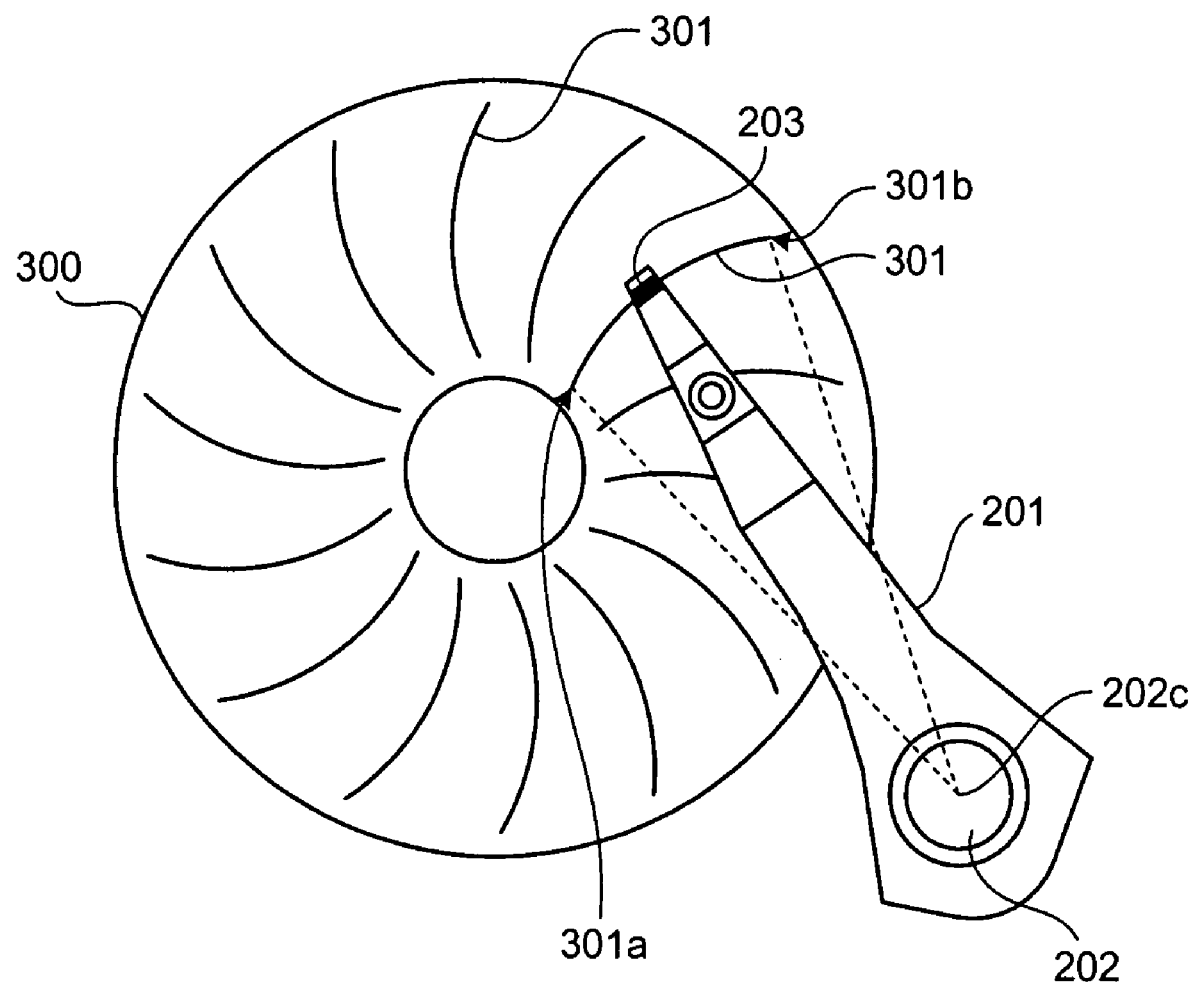
FIG. 2 is a schematic diagram for explaining movement of a magnetic head with respect to a magnetic disk according to the embodiment.

FIG. 2 is a schematic diagram for explaining movement of the magnetic head with respect to a magnetic disk 300. In the magnetic disk 300, servo-data and RRO-correction-data (hereinafter, "servo-and-RRO data") 301 is recorded on uniformly spaced substantially arc-shaped tracks that radially extend from the rotation center of the magnetic disk 300. The servo-and-RRO data 301 is recorded in the form of magnetic patterns spaced at a constant pitch.

The magnetic head that reads user data from the magnetic disk 300 includes a head actuator 201 that in turn includes a head slider 203 with a magnetic tip. The head actuator 201 moves in a fan-like pattern on a central axis 202c of a pivot 202. The magnetic tip of the head slider 203 traces a track from a first end 301a to a second end 301b along a circular arc. The servo-and-RRO data 301 is recorded in the arc-shaped tracks such that a constant distance is maintained between the magnetic tip of the head slider 203 and the central axis 202c when the magnetic tip of the head slider 203 traces a track.

FIG. 3 is a schematic diagram of the pattern (servo pattern) of the servo-and-RRO data 301 recorded on a sector in a track. The servo pattern includes variety of information recorded in a plurality of fields of the sector, viz., a servo preamble field, a servo sync mark field, a gray code field, an Even1 field, an Odd field, an Even2 field, an RRO preamble field, an RRO sync mark field, and an RRO data field. The magnetic tip of the head slider 203 reads the information from the fields in the abovementioned order along the track center indicated by vertical dotted lines in FIG. 3 to regenerate the servo-and-RRO data 301.

Generally, the servo data is recorded on the surface of a magnetic disk by magnetizing the grains (magnetic particles) on the surface to a predetermined magnetized state. However, because the distribution density of the grains is not uniform in a magnetic disk, the servo data that is demodulated after reading from the magnetic disk contains errors. Particularly, in the demodulated servo data, even a minute phase lag in the position and the traveling speed of the magnetic head affects the precise feedback-control of the magnetic head. Hence, it is necessary that the information about the position and the traveling speed of the magnetic head is accurate. However, errors in rotational synchronization inevitably occur upon reading of the servo data. Consequently, such errors need to be corrected to enable precise feedback-control of positioning of the magnetic head.

In the servo pattern of the servo-and-RRO data 301 shown in FIG. 3, the gray code field stores therein binary-coded decimal numbers indicating track numbers of the magnetic disk 300 (recorded in gray code) and sector numbers of the tracks. The Even 1 field and the Even 2 field provide the servo data used to demodulate information about the position or the traveling speed of the magnetic head. The Even1 field and the Even2 field form a uniform diagonal pattern making an identical angle with respect to the circumferential direction of the magnetic disk 300. The traveling speed of the magnetic head can be demodulated by using the phase difference between the servo signals regenerated from the Even1 field and the Even2 field in the same sector of the same track. The Odd field, along with the Even1 field and the Even2 field, provides the servo data used to demodulate information about the position of the magnetic disk 300. The odd field forms a diagonal pattern making an opposite angle with respect to the diagonal pattern of the Even1 field and the Even2 field.

The RRO preamble field is the preamble of the RRO correction data and represents a correction value of speed errors generated in rotational synchronization at the time of reading from or writing to the magnetic disk 300. In the RRO correction data, the correction value of the speed errors generated in rotational synchronization in each track is recorded. Alike the user data, the preamble of the RRO correction data is also recorded in a uniform recording density by varying the signal frequency corresponding to the radial position on the magnetic disk 300. As a result, irrespective of the radial position on the magnetic disk 300, the signals in the RRO preamble field are regenerated in a constant form. The FFT processor 103 performs operations on the signals of the RRO preamble field to obtain the fundamental wave and the nth-order harmonic wave. Thus, the head-gap can be precisely calculated by using the wavelength and the amplitude of the fundamental wave and of the nth-order harmonic wave irrespective of the radial position on the magnetic disk 300.

Figure 4A:
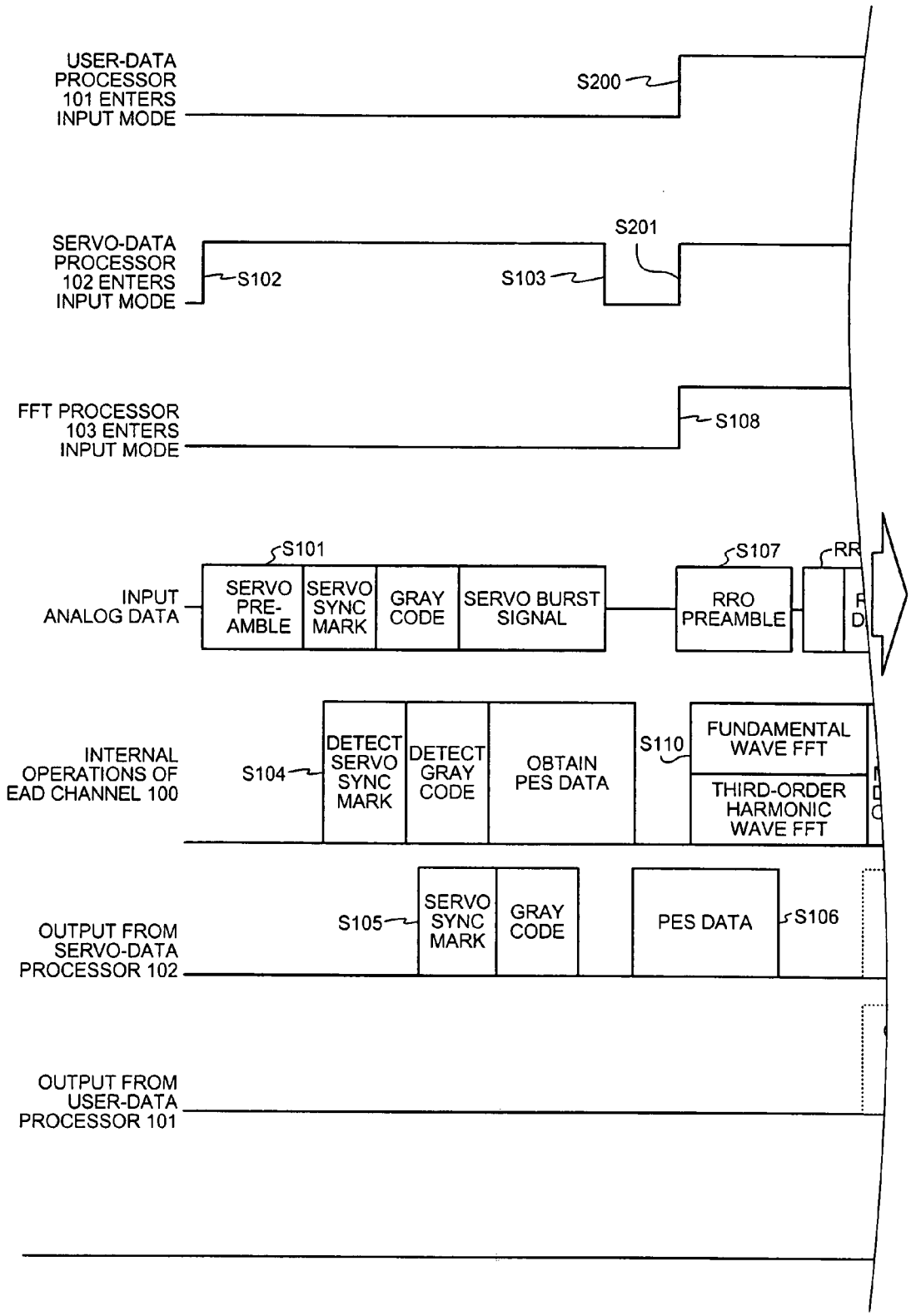
FIG. 4 is a time chart of the operations performed in the read channel.
Figure 4B:
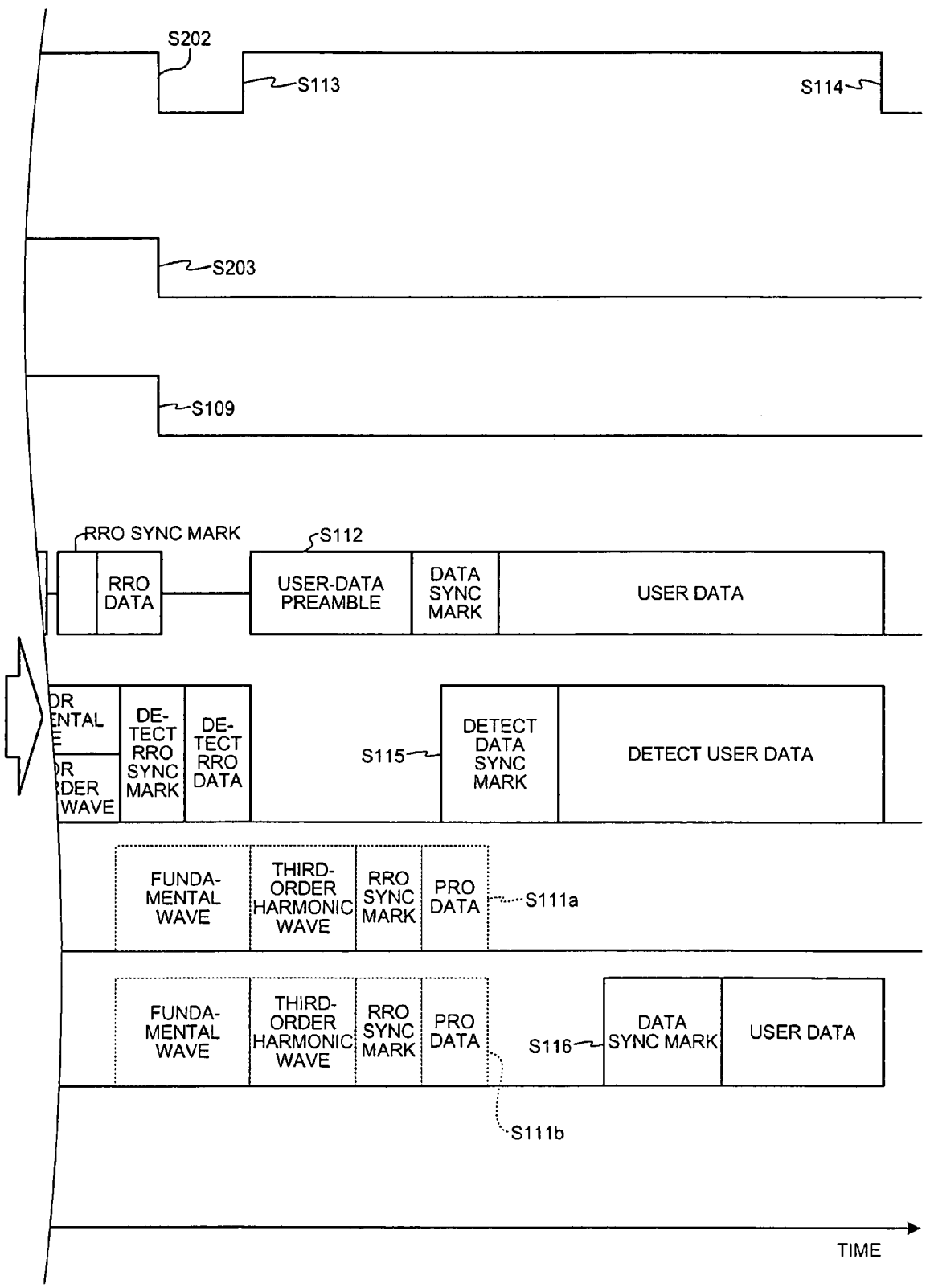

FIG. 4 is a time chart of the operations performed in the read channel 100. First, information, i.e., a servo preamble, a servo sync mark, a gray code, and servo burst signals are sequentially input to the analog front-end unit 104 (step S101). While the analog front-end unit 104 sequentially receives the information, the servo-data processor 102 enters input mode (step S102). When the analog front-end unit 104 completes receiving the servo burst signals, the servo-data processor 102 exits the input mode (step S103).

After the analog front-end unit 104 starts receiving the information, the SM detecting unit 102b detects the servo sync mark, the gray code detecting unit 102c detects the gray code, and the PES calculating unit 102e obtains PES data (step S104).

After the SM detecting unit 102b detects the servo sync mark and the gray code detecting unit 102c detects the gray code, the servo-data processor 102 sequentially outputs the servo sync mark and the gray code to the hard disk controller 200 via the formatting unit 102d (step S105). After the PES calculating unit 102e obtains PES data, the servo-data processor 102 outputs the PES data to the hard disk controller 200 via the formatting unit 102d (step S106).

Subsequently, information, i.e., a RRO preamble, a RRO sync mark, and RRO data are sequentially input to the analog front-end unit 104 (step 107). While the analog front-end unit 104 sequentially receives the information, the user-data processor 101 (or the servo-data processor 102) enters input mode (step S200, or step S201). At the same time, the FFT processor 103 also enters input mode (step S108). When the analog front-end unit 104 completes receiving the RRO data, the user-data processor 101 (or the servo-data processor 102) and the FFT processor 103 exit the input mode (step S202 (or step S203), and step S109).

After the analog front-end unit 104 starts receiving the information, the harmonic wave obtaining unit 103a calculates the wavelength and amplitude of the fundamental wave and of the third-order harmonic wave. At the same time, user-data processor 101 (or the servo-data processor 102) sequentially detects the RRO sync mark and the RRO data (step S110). Subsequently, the servo-data processor 102 outputs the wavelength and amplitude of the fundamental wave and of the third-order harmonic wave, as well as the RRO sync mark and the RRO data to the hard disk controller 200 via the formatting unit 102d (step S111a). Alternatively, the user-data processor 101 outputs the wavelength and amplitude of the fundamental wave and of the third-order harmonic wave, as well as the RRO sync mark and the RRO data to the hard disk controller 200 via the formatting unit 101e (step S111b).

Subsequently, information, i.e., a user-data preamble, a data sync mark, and user data are sequentially input to the analog front-end unit 104 (step S112). While the analog front-end unit 104 sequentially receives the information, the user-data processor 101 enters input mode (step S113). When the analog front-end unit 104 completes receiving the user data, the user-data processor 101 exits the input mode (step S114).

After the analog front-end unit 104 starts receiving the information, the SM detecting unit 101c sequentially detects the data sync mark and the user data (step S115). The user-data processor 101 then outputs the data sync mark and the user data to the hard disk controller 200 via the formatting unit 101e (step S116).

Figure 5:
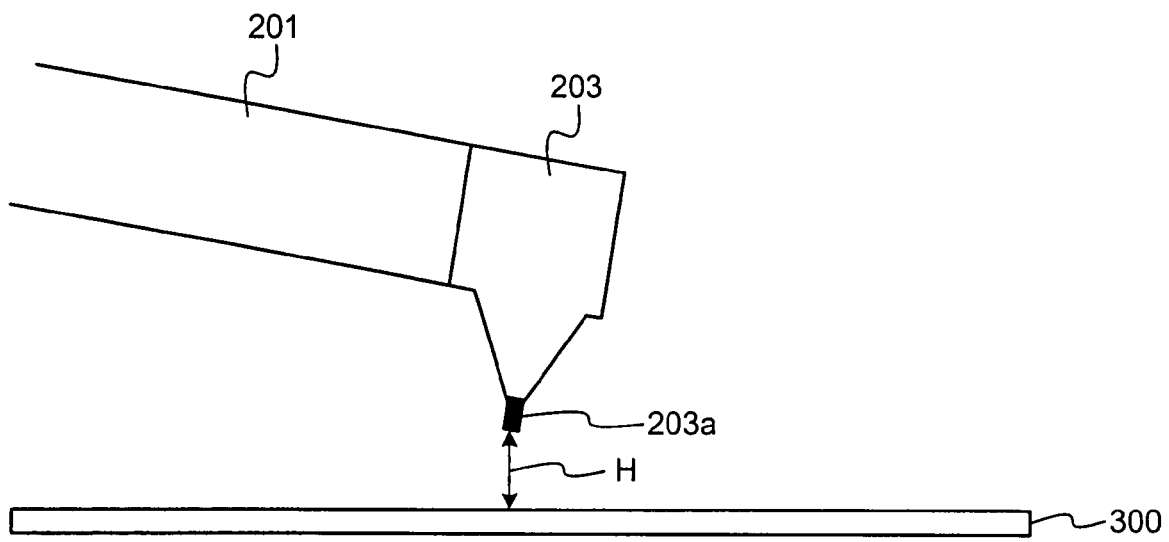
FIG. 5 is a schematic diagram for explaining a head-gap between the magnetic head and the magnetic disk.

Given below is the description of the head-gap of the magnetic head that reads user data from the magnetic disk 300. FIG. 5 is a schematic diagram depicting the head-gap between the magnetic head and the magnetic disk 300. As shown in FIG. 5, the head actuator 201 includes the head slider 203 with a magnetic tip 203a facing the surface of the magnetic disk 300. The gap between the leading edge of the magnetic tip 203a and the surface of the magnetic disk 300 is the head-gap H calculated from Equation (2) (or Equation (1)). Depending on the calculated value of the head-gap H, it is possible to readjust the head-gap H. To achieve a desired head-gap, e.g., the hard disk controller 200 can regulate the amount of heat applied by a heater (amount of electric current applied to a heater) embedded in the head slider 203 to freely deform the magnetic head or a film around the magnetic head such that the magnetic tip 203a is positioned closer to the magnetic disk 300.

Operation procedures, control procedures, specific names, and information including various kinds of data and parameters as described above can be arbitrarily changed unless otherwise specified. The configuration of devices and the components of each device shown in the drawings are based on functional concepts and need not be practically implemented in an exact manner as illustrated. That is, the functional and physical configuration of the devices is not limited to the accompanying drawings and can be subjected to overall or partial change based on the amount of usage.

The same operations or functions as described above can be implemented in entirety or partially by executing a computer program in a central processing unit (CPU) (or a micro processing unit (MPU), or micro controlling unit (MCU)). The operations can also be performed by using hardware such as a wired logic.

As set forth hereinabove, according to an embodiment of the present invention, control signals necessary for reading user data are converted into higher harmonic signal data to obtain a fundamental wave and a higher harmonic wave. A head-gap between a head and a surface of a disk is calculated by using the fundamental wave and the higher harmonic wave. Thus, there is no need to store in advance signals dedicated for calculating the head-gap in a storage medium. As a result, not only the storage capacity of the storage medium can be efficiently utilized but the head-gap can be precisely calculated and controlled as per requirement.

Moreover, the head-gap can be calculated at the time of reading user data as well as servo data to enable real-time control of the head-gap.

Furthermore, the higher harmonic wave is obtained at a constant interval such that the head-gap can be calculated after each interval.

Moreover, because the control signals are recorded in a uniform recording density irrespective of the radial position on the storage medium, the higher harmonic wave having uniform frequency characteristics can be obtained.

Furthermore, because the head-gap is calculated by using the control signals necessary for reading user data, which is recorded uniformly in the storage medium, without being affected by various surrounding conditions, not only the storage capacity of the storage medium can be efficiently utilized but the head-gap can be precisely calculated without difficulty.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-gap calculating device that calculates a head-gap between a storage medium and a head in a storage device, the head-gap calculating device comprising:
   a converting unit that receives via the head a plurality of analog signals from the storage medium, and converts the analog signals into digital signals;
   a wave-component obtaining unit that performs signal conversion on control signals necessary for reading user data from among the digital signals to obtain a fundamental wave component and a higher harmonic wave component; and
   a head-gap calculating unit that calculates the head-gap based on the fundamental wave component and the higher harmonic wave component.

2. The head-gap calculating device according to claim 1, further comprising:
   a decoding unit that decodes a user-data signal from among the digital signals;
   an analyzing unit that analyzes a servo-data signal from among the digital signals; and
   an output unit that selectively outputs to at least one of the decoding unit and the analyzing unit the fundamental wave component and the higher harmonic wave component, wherein
   the head-gap calculating unit receives the fundamental wave component and the higher harmonic wave component from selected one of the decoding unit and the analyzing unit, and calculates the head-gap based on the fundamental wave component and the higher harmonic wave component.

3. The head-gap calculating device according to claim 1, wherein the control signals are periodically and radially recorded in circumferential direction of the storage medium.

4. The head-gap calculating device according to claim 3, wherein the control signals are recorded with uniform density irrespective of a radial position on the storage medium.

5. The head-gap calculating device according to claim 4, wherein the control signals represent preamble of repeatable run-out correction data.

6. The head-gap calculating device according to claim 1, wherein the higher harmonic wave component is a third-order harmonic-wave component.

7. A storage device comprising a head-gap calculating device that calculates a head-gap between a storage medium and a head in a storage device, the head-gap calculating device including a converting unit that receives via the head a plurality of analog signals from the storage medium, and converts the analog signals into digital signals;

a wave-component obtaining unit that performs signal conversion on control signals necessary for reading user data from among the digital signals to obtain a fundamental wave component and a higher harmonic wave component; and a head-gap calculating unit that calculates the head-gap based on the fundamental wave component and the higher harmonic wave component.

8. The storage device according to claim 7, wherein the head-gap calculating device further includes a decoding unit that decodes a user-data signal from among the digital signals;

an analyzing unit that analyzes a servo-data signal from among the digital signals; and an output unit that selectively outputs to at least one of the decoding unit and the analyzing unit the fundamental wave component and the higher harmonic wave component, wherein the head-gap calculating unit receives the fundamental wave component and the higher harmonic wave component from selected one of the decoding unit and the analyzing unit, and calculates the head-gap based on the fundamental wave component and the higher harmonic wave component.

9. A head-gap calculating method for calculating a head-gap between a storage medium and a head in a storage device, the head-gap calculating method comprising:

converting a plurality of analog signals read via the head from the storage medium into digital signals;

obtaining a fundamental wave component and a higher harmonic wave component by performing signal conversion on control signals necessary for reading user data from among the digital signals; and calculating the head-gap based on the fundamental wave component and the higher harmonic wave component.

10. The head-gap calculating method according to claim 9, further comprising:

decoding a user-data signal from among the digital signals;

analyzing a servo-data signal from among the digital signals; and selecting at least one of the decoding and the analyzing to output the fundamental wave component and the higher harmonic wave component, wherein the calculating includes calculating the head-gap based on the fundamental wave component and the higher harmonic wave component obtained through selected one of the decoding and the analyzing.

11. A computer-readable recording medium that stores therein a computer program that causes a computer to calculate a head-gap between a storage medium and a head in a storage device, the computer program causing a computer to execute:

converting a plurality of analog signals read via the head from the storage medium into digital signals;

obtaining a fundamental wave component and a higher harmonic wave component by performing signal conversion on control signals necessary for reading user data from among the digital signals; and calculating the head-gap based on the fundamental wave component and the higher harmonic wave component.

12. The computer-readable recording medium according to claim 11, further comprising:

decoding a user-data signal from among the digital signals;

analyzing a servo-data signal from among the digital signals; and selecting at least one of the decoding and the analyzing to output the fundamental wave component and the higher harmonic wave component, wherein the calculating includes calculating the head-gap based on the fundamental wave component and the higher harmonic wave component obtained through selected one of the decoding and the analyzing.

* * * * *